Figure 7:
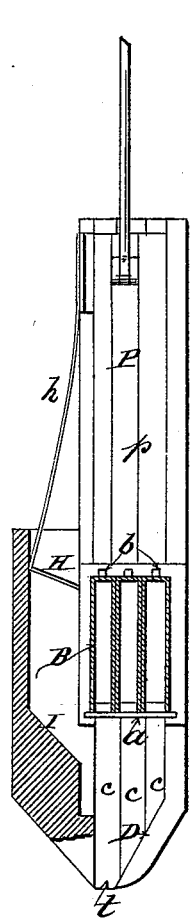

(No Model.) 3 Sheets—Sheet 1.
L. K. JOHNSON & A. A. LOW.
TYPE SETTING APPARATUS.
No. 562,083. Patented June 16, 1896.
Fig. 1. Fig. 2.
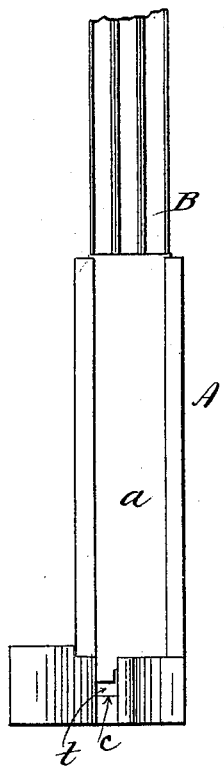
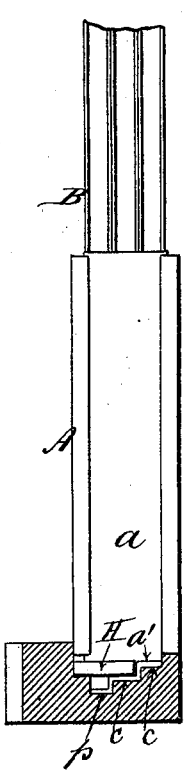
Fig. 3. Fig. 4.
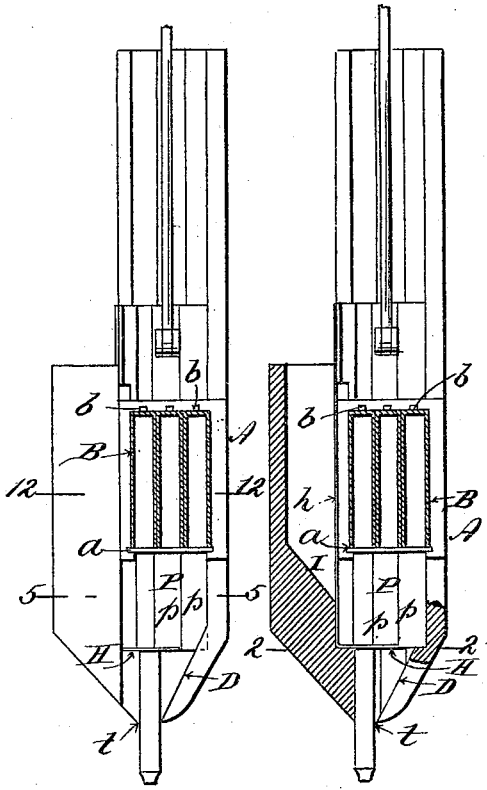
Fig. 5. 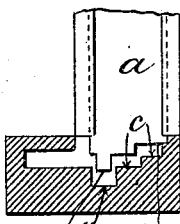 Fig. 6.
Witnesses:
D. W. Gardner.
Charles T. Rowley.
Inventors:
Louis Kossuth Johnson
Abbot Augustus Low
By their Attorney
George William Miatt (No Model.)  3 Sheets—Sheet 2.

L. K. JOHNSON & A. A. LOW.
TYPE SETTING APPARATUS.

No. 562,083.  Patented June 16, 1896.

Witnesses:
D. W. Gardner.
Charles T. Rowley.

Inventors:
Louis Hossuth Johnson
Abbot Augustus Low
By their attorney
George William Miatt (No Model.) 3 Sheets—Sheet 3.
L. K. JOHNSON & A. A. LOW.
TYPE SETTING APPARATUS.
No. 562,083. Patented June 16, 1896.
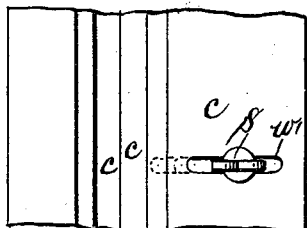
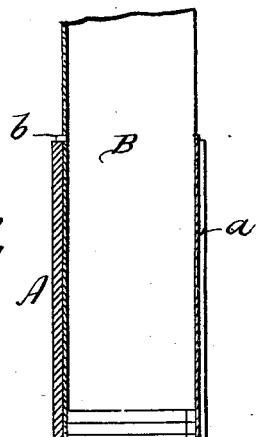
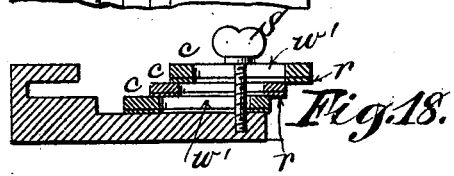
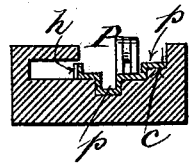
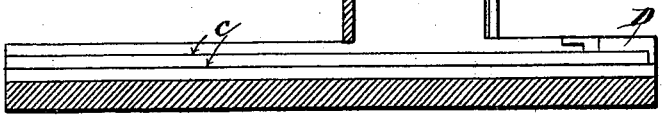
Witnesses:
D. W. Gardner.
Charles T. Rowley.
Inventors:
Louis Kossuth Johnson
Abbot Augustus Low
By their Attorney
George William Miatt

United States Patent Office.

LOUIS KOSSUTH JOHNSON AND ABBOT AUGUSTUS LOW, OF BROOKLYN, NEW YORK, ASSIGNORS TO THE ALDEN TYPE MACHINE COMPANY, OF NEW YORK, N. Y.

TYPE-SETTING APPARATUS.

SPECIFICATION forming part of Letters Patent No. 562,083, dated June 16, 1896.

Application filed October 29, 1895. Serial No. 567,266. (No model.)

*To all whom it may concern:*

Be it known that we, LOUIS KOSSUTH JOHNSON and ABBOT AUGUSTUS LOW, citizens of the United States, residing in the city of Brooklyn, in the county of Kings and State of New York, have invented certain new and useful Improvements in Type-Setting Apparatus, of which the following is a specification, sufficient to enable others skilled in the art to which the invention appertains to make and use the same.

Our invention relates to the assembling of types in words, groups, or combinations that will facilitate the setting of type by hand, the several characters or types being removed simultaneously by and between the fingers of the compositor.

In the automatic distribution of types into type-containing channels for use in the setter-case, it is found most convenient and desirable to deposit them on the "flat,"—that is to say, with their broad sides resting against each other. In order to assemble the several types from the different type-containing channels to form a word or combination, it has been necessary to turn them on their longitudinal axes in order to bring them into proper relation to each other, and we have heretofore devised special means for accomplishing this result, as in our Patents No. 539,948, issued May 28, 1895, No. 539,949, issued May 28, 1895, and No. 539,950, issued May 28, 1895.

Our present invention is designed to accomplish a like result without turning the types on their longitudinal axes, at the same time allowing us to place the type-containing channels close together side by side, and thereby render the apparatus more simple, compact, and convenient, while lessening the movement and wear and tear upon the types.

The invention consists, essentially, in arranging the type-containing channels for a word or combination of characters successively one above the other above steps or type-supporting shoulders corresponding approximately in thickness or height to the thickness of the types themselves, in forwarding the types upon said terraced type-supporting shoulders until they are free of their type-containing channels, and in then causing the higher types to slide over and upon those next below by means of a converging side wall or walls, so that they finally rest one upon the other upon their flat sides, in perfect alinement, in position for removal by hand.

It will be seen that by our present method of assembling the types the lateral movement of the types is reduced to the minimum. The types are slid easily and naturally one over the other without jar or danger of displacement, and are controlled positively during the whole operation. Furthermore, the assembled types are presented in the most convenient and favorable position for removal by hand.

An incidental feature of our present invention consists in making the type-supporting terraces or ways adjustable in width to adapt them to variations in the size or style of fonts to be used in connection with the case, and in compensating for variations in thickness by the use of spacing-washers or equivalents interposed between the plates.

Figure 10:
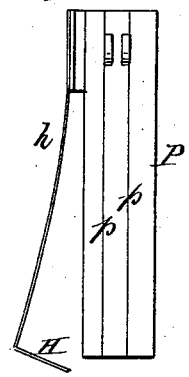
Figure 8:
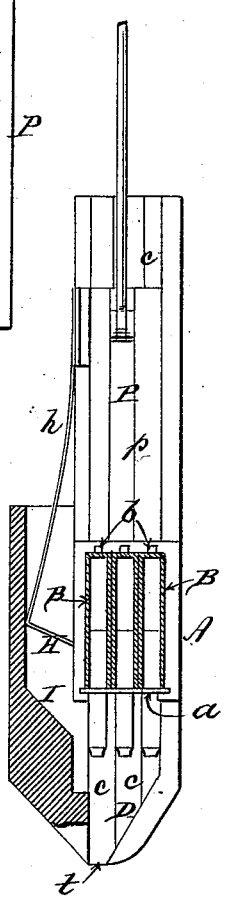
Figure 9:
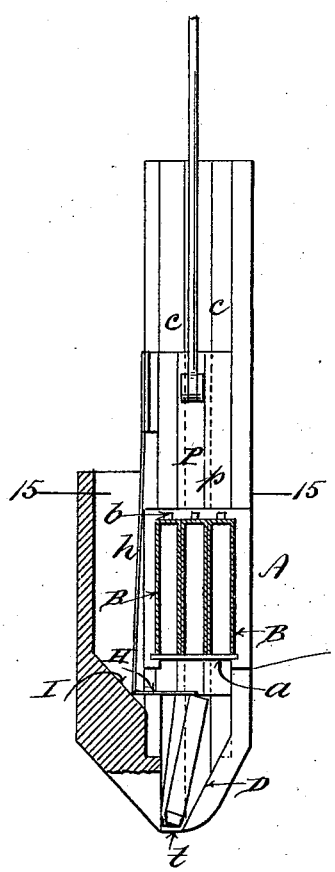
Figure 11:
Figure 12:
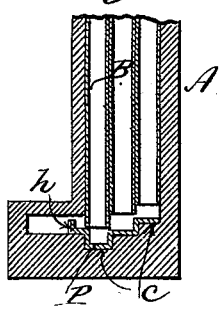

In the accompanying drawings, Figure 1 is a front elevation of the device; Fig. 2, a sectional elevation on plane of line 2 2, Fig. 4; Fig. 3, a horizontal section through the type-containing channels, showing a plan of the device with the pusher at the end of its forward stroke; Fig. 4, a similar view showing portions of the side walls also in section. Fig. 5 is a section upon plane of line 5 5, Fig. 3; and Fig. 6, a similar view, the pusher being omitted. Figs. 7, 8, and 9 are views similar to Fig. 4, showing the pusher at different points of its stroke. Fig. 10 is a plan of the pusher-plate; Fig. 11, a side view thereof; Fig. 12, a section upon plane of line 12 12, Fig. 3. Fig. 13 is a central longitudinal section showing the pusher in elevation. Fig. 14 is a similar view, the pusher and front plate being omitted. Fig. 15 is a section upon plane of line 15 15, Fig. 9. Fig. 16 is a similar view, the pusher being omitted. Figs. 17 and 18 are views illustrating the adjustment of the plates by which the terraced typeways are formed.

A represents the holder for the series of type-containing channels B, any desired number of which may be combined to form a desired word or combination of characters. The channels B are supported in the holder A by any suitable means, as by the pins b b, as heretofore. They are, however, supported at different heights, corresponding to the terraced type supports or ways c c, upon which the types rest independent of the channels.

The terraced ways c c are arranged successively at different levels corresponding to the thicknesses of the types to be accommodated. The space between each way c c and the lower end of the type-containing channel above exceeds but slightly the thickness of the type, and the front plate a of the holder A is formed with the offsets a' a', and is set to admit of the forwarding of one type only from each channel.

The pusher-blade P consists, preferably, though not necessarily, of a plate of sheet metal stamped up or otherwise formed with the steps p p, corresponding to and fitting over the terraced typeways c c. The blade P is of a length equal to or greater than that of the stroke required, so that the columns of types are supported thereon during the forwarding of the lowest types, which latter drop in front of the forward edge of the pusher when it is retracted.

During the forward stroke of the pusher the types encounter the converging wall D, and are thereby guided over each other until they finally rest in perfect alinement with their forward ends projecting through the port t.

In order to compensate for the difference in level presented by the front edge of the pusher owing to the arrangement of the channels at different levels, we provide a heel-plate H, which automatically enters behind the types after they have cleared their channels, and thereby affords support for the heels of the higher types as they slide over those next below. A convenient method of accomplishing this is by means of the metallic spring shown herein, the spring h and heel-plate H being formed in one piece. An incline I forces the heel-plate H in behind the types at the proper time during the forward stroke of the pusher, to the rear end of which the spring h is secured, and the resilience of the spring causes it to withdraw the heel-plate during the retractile movement of the pusher.

In order to adapt the device to types of different widths, the ways c c may be made of plates superposed one over the other, as shown in Figs. 17 and 18, the plates being held adjustably by set-screws S, passing through transverse slots w' w'. Differences in the thickness of types is compensated for by the interposition of washers r r between the plates c c for the larger types.

What we claim as our invention, and desire to secure by Letters Patent, is—

1. In a type-case, the combination of a series of type-containing channels arranged successively at different heights, a series of type-supporting terraces or ways arranged successively below the type-containing channels at correspondingly-different heights, and a type-forwarder for advancing the types beyond their type-channels, substantially in the manner and for the purpose described.

2. In a type-case, the combination of a series of type-containing channels arranged successively at different heights, a series of type-supporting terraces or ways arranged successively below the type-containing channels at correspondingly-different heights, a type-forwarder, and a converging guide for assembling the types one over the other under the action of the pusher, substantially in the manner and for the purpose described.

3. In a type-case, the combination of a series of type-containing channels arranged successively at different heights, a series of type-supporting terraces or ways arranged successively below the type-channels at correspondingly-different heights, a type-forwarder, and means for adjusting the width of the said type terraces or ways, substantially in the manner and for the purpose described.

4. In a type-case, the combination of a series of type-containing channels arranged successively at different heights, and a series of type-supporting terraces or ways consisting of plates superposed one over the other together with means for adjusting them and clamping them with relation to each other for the purpose and substantially in the manner described.

5. In a type-case, the combination of a series of type-containing channels arranged successively at different heights, a series of type-supporting terraces or ways arranged successively below the type-channels at correspondingly-different heights, and a type-forwarder formed with a series of offsets corresponding to the terraced typeways so as to pass between the latter and the lower ends of the type-containing channels substantially in the manner and for the purpose described.

6. In a type-case, the combination of a series of type-containing channels arranged successively at different heights, a series of terraced type-supporting ways arranged successively below the type-channels at correspondingly-different heights, and a type-forwarder formed with a series of offsets corresponding to the terraced typeways so as to pass between the latter and the lower ends of the type-channels, and with a laterally-movable heel-plate for supporting the heels of the types beyond the type-containing channels, substantially in the manner and for the purpose described.

7. In a type-case, the combination of the series of type-containing channels arranged successively at different heights, the series of terraced type-supporting ways arranged successively below the type-channels at correspondingly-different heights, the type-forwarder formed with a series of offsets corresponding to the terraced typeways, and the spring heel-plate and its guiding-surface acting automatically during the reciprocation of the pusher, substantially in the manner and for the purpose described.

8. In a type-case, the combination of a series of type-containing channels arranged at different levels and a series of terraced type-supporting ways consisting of plates which are adjustable one upon the other, substantially in the manner and for the purpose described.

9. In a type-case, the combination of a series of type-containing channels arranged at different levels, and a series of type-supporting ways consisting of plates with washers interposed between them for the purpose and substantially in the manner described.

LOUIS KOSSUTH JOHNSON.
ABBOT AUGUSTUS LOW.

Witnesses:
D. W. GARDNER,
GEORGE WILLIAM MIATT.